(12) United States Patent
Hitt

(10) Patent No.: US 6,249,779 B1
(45) Date of Patent: Jun. 19, 2001

(54) ADAPTIVE FUZZY FEATURE MAPPING

(76) Inventor: Ben A. Hitt, 9 Forest Hills, Wheeling, WV (US) 26003

( * ) Notice: Subject to any disclaimer, the term of this patent is extended or adjusted under 35 U.S.C. 154(b) by 0 days.

(21) Appl. No.: 09/078,453

(22) Filed: May 13, 1998

(51) Int. Cl.[7] .................................................. G06F 15/18
(52) U.S. Cl. .............................. 706/1; 706/2; 706/900; 382/209; 707/5; 707/6
(58) Field of Search .................................. 706/1, 900, 2; 382/209; 707/6, 5

(56) References Cited

U.S. PATENT DOCUMENTS

| | | | |
|---|---|---|---|
| 5,046,019 | * | 9/1991 | Basehore .................................. 706/1 |
| 5,127,063 | * | 6/1992 | Nishiya et al. ...................... 706/900 |
| 5,499,319 | * | 3/1996 | Sultan et al. ............................. 706/1 |
| 5,515,477 | * | 5/1996 | Sutherland ............................. 706/41 |
| 5,531,227 | * | 7/1996 | Schneider ............................. 600/425 |
| 5,537,330 | * | 7/1996 | Damiano et al. ...................... 716/18 |
| 5,606,690 | * | 2/1997 | Hunter et al. ............................ 707/5 |
| 5,638,460 | * | 6/1997 | Nishimori et al. ................... 382/141 |
| 5,706,497 | * | 1/1998 | Takahashi et al. ...................... 707/6 |
| 6,018,735 | * | 1/2000 | Hunter et al. ............................. 706/2 |

OTHER PUBLICATIONS

Liu et al, "Finding Interesting Patterns Using User Expectations", IEEE Transactions on Knowledge and Data Engineering, Nov./Dec. 1999.*

Wu et al, "Facial Image Retrieval Identification and Interference Systems", Proceedings of International Multimedia Conference, Aug. 1993.*

T. Van Le, "Fuzzy Pattern Matching and its Application to System Simulation", IEEE 4th Annual Conference on AI, Simulation, and Planning in High Autonomy Systems.*

* cited by examiner

Primary Examiner—George B. Davis
(74) Attorney, Agent, or Firm—Steptoe & Johnson PLLC

(57) ABSTRACT

An adaptive fuzzy feature mapping (AFFM) technique provides a method for identifying and matching a new data pattern against a set of known data patterns using a combination of distance measurements and fuzzy logic functions. Known data patterns are stored as organized nodes in a pattern map wherein each organized node is defined by one or more attribute coefficients. As distance measurement is computed between a new data pattern and each organized node of the pattern map using distance measurement wherein the organized node having the smallest distance measurement to the new data pattern receives the highest ranking. Traversing the organized nodes according to the ranking, the new data pattern is compared to each organized node using fuzzy logic functions. If the new data pattern matches an organized node based on an acceptable degree of fuzziness, the attribute coefficients of the organized node are updated to reflect those coefficients of the new data pattern. If the new data pattern does not match any of the organized nodes in the pattern map, a new organized node is created in the pattern map representing the attribute coefficients of the new data pattern.

25 Claims, 4 Drawing Sheets

ADAPTIVE FUZZY FEATURE MAPPING

BACKGROUND OF THE INVENTION

1. Field of the Invention

This invention related to pattern matching, and more specifically, to a method for recognizing and classifying a data pattern in a data stream by combining distance based functions and fuzzy logic techniques.

2. Related Art

Automation is becoming increasingly important in today's world and lifestyle. This is evidenced by the growth of computer networks, automatic transaction and service machines, and the vast number of daily business transactions handled electronically. All of these various business related events are typically monitored for various reasons, such as accuracy, security, marketing, inventory, scheduling, and the like. Therefore, there is a need for computer software to quickly, efficiently, and correctly identify patterns in data streams.

There are two principal methods for recognizing and classifying a data pattern in a single data stream. These methods are Fuzzy Adaptive Resonance Theory &Fuzzy ART) and Feature Mapping. Both methods are well-known and well published in the relevant arts. In summary, Fuzzy ART determines how close two patterns match each other by calculating the closeness, or fuzziness, of the fit, e.g., two patterns are a seventy-five percent (75%) match. With Fuzzy ART, a user can set the acceptable value, or degree, of fuzziness for determining a match. Thus, Fuzzy ART monitors a data stream for patterns and groups them together based on the percentage of similarity.

One disadvantage with Fuzzy ART is the fact that data patterns degrade over time. Conventional pattern matching systems, including Fuzzy ART, represent known data patterns as organized nodes wherein each organized node maintains a set of attribute coefficients defining a specific known data pattern. Therefore, when a new data pattern is identified in a new data stream, the new data pattern is compared against the known data patterns as represented by the organized nodes. If the new data pattern matches an organized node, the attribute coefficients of the matching organized node are updated to reflect the new data pattern. Because data patterns degrade overtime, the attribute coefficients of the organized node corresponding to the data pattern also degrade overtime until the organized node no longer accurately represents the data pattern. Eventually, the system must create a new organized node to represent the data pattern. Therefore, there is a need for a computer based system that identifies and classifies data patterns which minimizes the recreation of new organized nodes.

In contrast to fuzzy logic techniques, Feature Mapping is based on distance measurements. When a first pattern is identified, the pattern matching system of Feature Mapping assigns the patter to a point in N-dimensional space. A user then defines a radius around that point, thereby defining a perimeter of a cluster that corresponds to a specific data pattern wherein the first data pattern is the centroid of the cluster. Therefore, if a second pattern falls within the cluster as defined by the first pattern, then the second pattern matches the first pattern and belongs to the same cluster. If a point defining another pattern falls outside of the cluster, then a pattern is detected resulting in a new cluster being formed. As a cluster is defined by various points falling within the set radius, the detail of each data pattern is not lost because each pattern is maintained as a separate point in the cluster. Also, this method stabilizes the pattern identified by the cluster by moving the centroid of the circle according to the points defining the cluster. Thus, Feature Mapping monitors a data stream for patterns and groups them together based on the distance from the centroid of the cluster.

A disadvantage of Feature Mapping is the determination of a cluster's radius. Conventional systems use an arbitrary initial radius which is adjusted based on trial and error. Therefore, Feature Mapping may not accurately reflect a known data pattern because the chosen radius of the clusters may be incorrect.

A second disadvantage of Feature Mapping is the ease in which two data streams containing the same data pattern are misclassified as two different data patterns (each a separate cluster) due to a single simple difference between the data streams. For example, if there is one data stream containing a data pattern in which the signal has a spike up at the signal's end and there is a second data stream containing the same data pattern but the signal has a spike down at the signal's end, under Feature Mapping, these data patterns are classified in two different clusters, thereby determining that they are two separate data patterns. However, based on this scenario, the data patterns should be classified as the same data pattern. Therefore, there is a need for a computer based system that identifies and classifies data patterns which handles minor discrepancies between data patterns without identifying and classifying such minor differences as a new data pattern.

SUMMARY OF THE INVENTION

The present invention solves the problems associated with conventional methods of identifying and matching a new data pattern with known data patterns by combining distance based functionality and fuzzy logic techniques. Structurally, a known data pattern is represented by an organized node having one or more attribute coefficients which describe the known data pattern. A pattern map then groups together one or more such organized nodes. Therefore, in the present invention, when a new data pattern is received, the new data pattern is compared to each organized node (or known data patter) in a pattern map using distance measurement functions.

Once the comparisons are complete, the organized nodes are ranked within the pattern map according to their respective distance measurements. More specifically, the organized node having the shortest distance measurement received the highest ranking because that organized node is closest to matching the new data pattern. The order of ranking progresses according to the order of matching with the organized node having the longest distance measurement receiving the lowest ranking.

Once the ranking is complete, the new data pattern is again compared to the organized nodes of the pattern map. However, this time the comparison is performed according to the ranking of the organized nodes and using fuzzy logic techniques. The new data pattern is compared first to the organized node having the highest ranking, and so on in order, until the new data pattern is compared last to the organized node having the lowest ranking. If the new data pattern is determined to match an organized node during a comparison, the attribute coefficients for the corresponding organized node are updated to reflect the new data pattern. If the new data pattern does not match any of the organized nodes in the pattern map by using fuzzy logic techniques, a new organized node is created in the pattern map and assigned the attribute coefficients matching the new data pattern.

The principle advantage to the pattern matching technique of the present invention is the unique combination of using both distance measurement techniques and fuzzy logic functions in identifying and classifying a new data pattern. Further, the present invention requires less memory during operation and performs pattern matching with a high degree of accuracy.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

1. Host system of a preferred environment for the present invention

Figure 1:
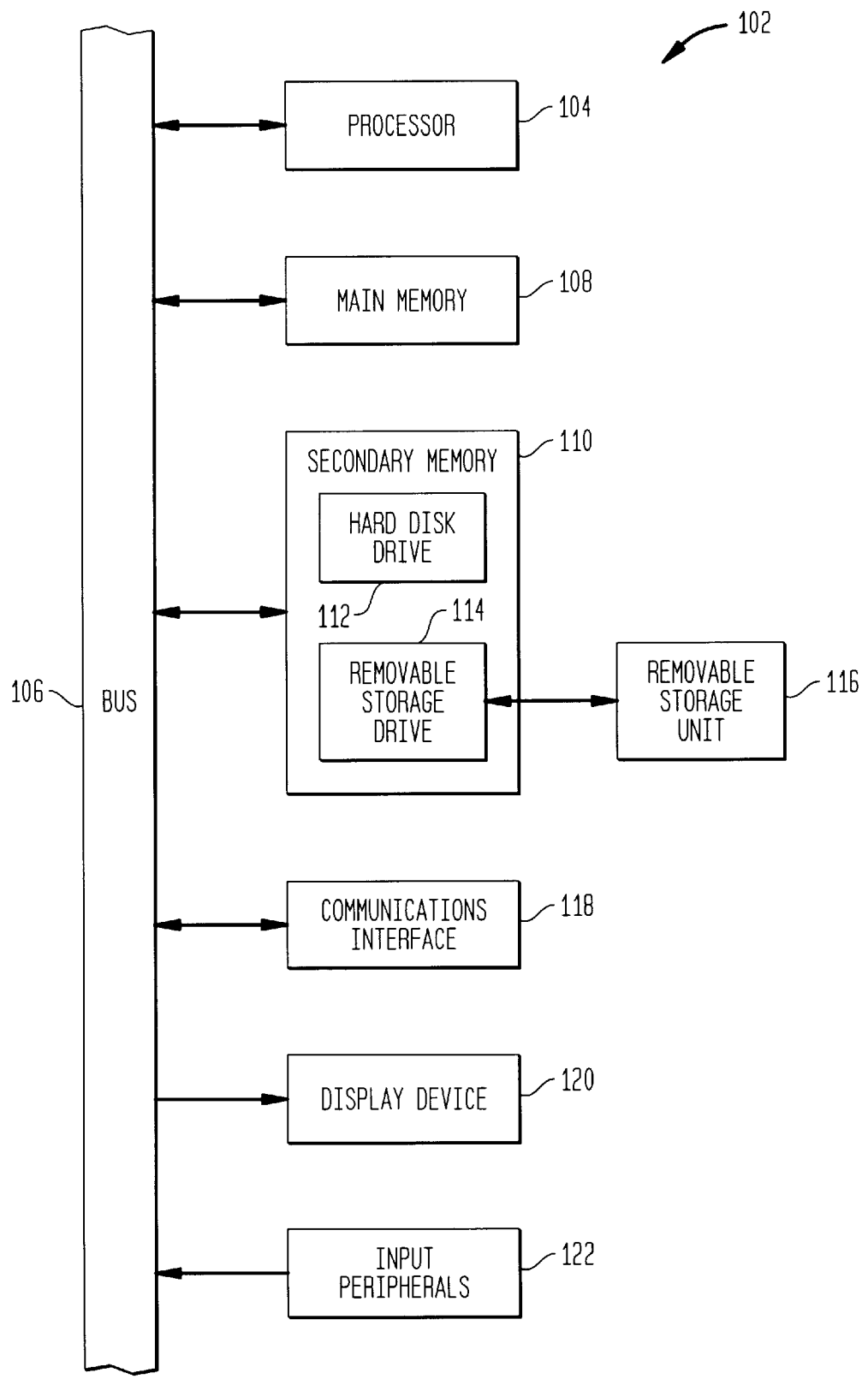
FIG. 1 is a block diagram showing an exemplary computer system useful for implementing the present invention.

The chosen embodiment of the present invention is computer software executing within a computer system. FIG. 1 shows an exemplary computer system. The computer system 102 includes one or more processors, such as a processor 104, the processor 104 is connected to a communication bus 106.

The computer system 102 also includes a main memory 108, preferably random access memory (RAM), and a secondary memory 110. The secondary memory 110 includes, for example, a hard disk drive 112 and/or a removable storage drive 114, representing a floppy disk drive, a magnetic tape drive, a compact disk drive, a program cartridge and cartridge interface (such as that found in video game devices), a removable memory chip (such as EPROM, or PROM), etc. which is read by and written to by a removable storage unit 116. The removable storage unit 116, also called a program storage device or a computer program product, represents a floppy disk, magnetic tape, compact disk, etc. As will be appreciated, the removable storage unit 116 includes a computer usable storage medium having stored therein computer software and/or data. The removable storage drive 114 reads from and/or writes to a removable storage unit 116 in a well known manner.

The computer system 102 may also include other similar means for allowing computer programs or other instructions to be loaded. Such means can include, for example, a communications interface 118. Communications interface 118 allows software and data to be transferred between computer system 102 and external devices. Examples of communications interface 118 can include a modem, a network interface (such as an Ethernet card), a communications port, etc. Software and data transferred via communications interface 118 are in the form of signals which can be electronic, electromagnetic, optical or other signals capable of being received by communications interface 118.

In this document, the term "computer program product" is used to generally refer to removable storage unit 116, a hard disk installed in hard disk drive 112, and signals transferred via communications interface 118. These computer program products are means for providing software to a computer system 102.

In an embodiment where the invention is implemented using software, the software may be stored in main memory 108, or in a computer program product and loaded into computer system 102 using removable storage drive 114, hard disk drive 112, or communications interface 118. The software, when executed by the processor 104, causes the processor 104 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

The preferred embodiment of the present invention is also directed to a computer system 102 including a display device 120 and one or more input peripherals 122. The display device 120 represents a computer screen or monitor on which a graphical user interface, including a window environment, may be displayed. The input peripherals 122 include, for example, a keyboard, a mouse, a light pen, a pressure-sensitive screen, etc., which provide a user with the capability of entering input to the computer system 102.

The preferred embodiment of the present invention is directed to execute on a computer system 102 using the UNIX operating system. UNIX is commercially available and is well known in the relevant arts. The preferred computer system 102 is a SUN workstation, by the present invention also can be developed on a personal or mainframe computer. The present invention is described in terms of a computer system 102 having a single processor 104 for convenience purposes only. It would be readily apparent, however, to one skilled in the relevant arts to use a computer system 102 having multiple processors 104, thereby executing the present invention in parallel. There are no memory requirements for developing and executing the present invention. However, the computer system 102 achieves better performance with more main memory 108 and secondary memory 110. The preferred embodiment of the present invention is implemented in software, and more specifically, is written in the programming language C++. The preferred embodiment is described in these terms for convenience purpose only. Other comparable computer systems 102, operating systems, and programming languages could alternatively be used.

2. Overview of an Adaptive Fuzzy Feature Mapping (AFFM)

Figure 2:
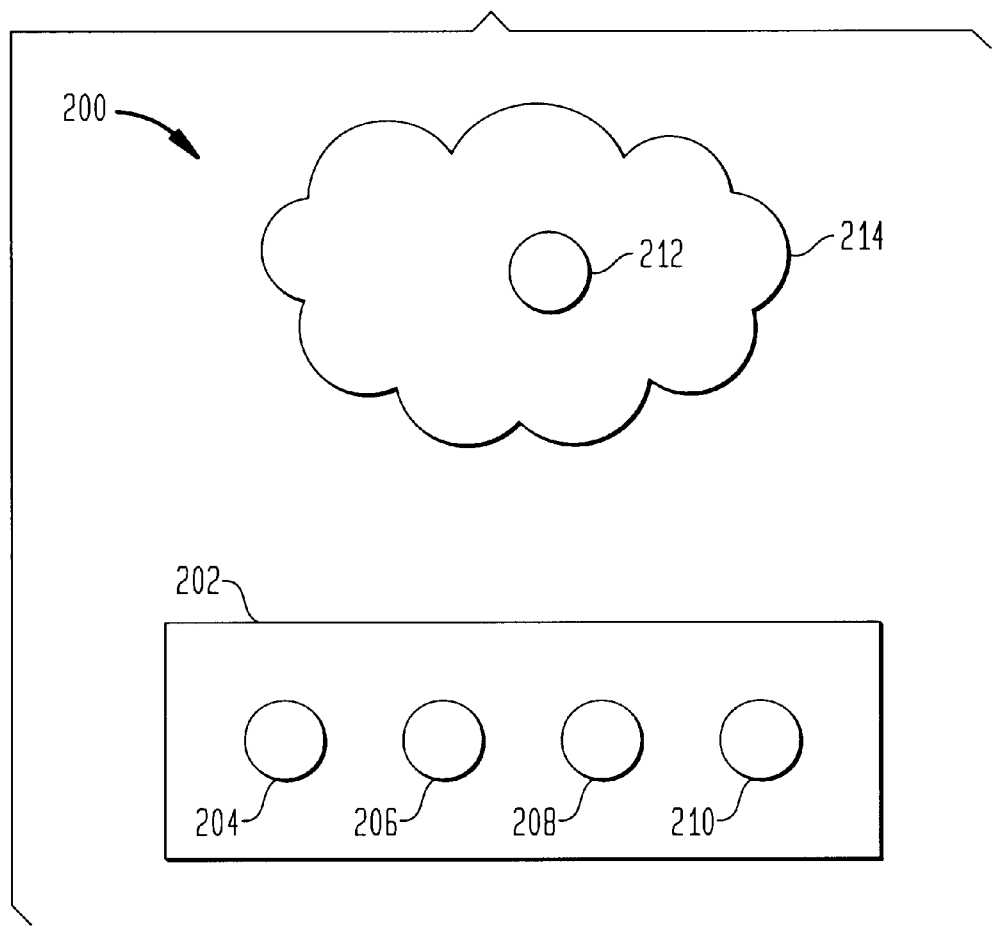
FIG. 2 is a block diagram showing the relationship between a new data pattern and an adaptive fuzzy feature mapping (AFFM)
Figure 3:
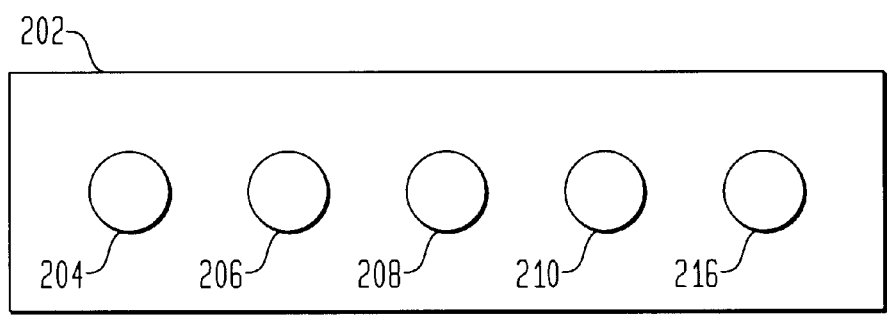
FIG. 3 is a block diagram showing a new AFFM.

FIGS. 2 and 3 are block diagrams showing the relationship between a new data pattern 212 and an adaptive fuzzy feature mapping (AFFM) system 200. A data stream 214 is received that contains a new data pattern 212. The new data pattern 212 is then compared against a pattern map 202 of known data patterns, wherein each known data pattern is represented by an organized node 204–210. Each organized node 204–210 records a set of one or more attribute coefficients defining a specific known data pattern. The use of organized nodes 204–210 and attribute coefficients to define data patterns is well known in the relevant art, and it would be readily apparent to one of ordinary skill in the art to implement a pattern map 202 as defined herein.

When the AFFM system 200 detects and identifies a new data pattern 212, the new data pattern 212 is compared to each organized node 204–210 of the pattern map 202 using a first pattern matching technique. In the preferred embodiment, the comparison is made using a conventional distance based method for matching data patterns. Distance based methods for matching data patterns are well known in the relevant arts. It would be readily apparent to one of ordinary skill in the relevant arts to select and implement a distance based method for the present invention.

The organized nodes 204–210 are then ranked according to the comparison results. In the preferred embodiment, the organized node 204–210 having the closest comparison (the shortest distance measurement) with the new data pattern 212 receives the highest ranking. The ranking of the organized nodes 204–210 continues according to the respective distance measurement calculated for each organized node 204–210 with the organized node 204–210 having the farthest comparison (the longest distance measurement) with the new data pattern 212 receiving the lowest ranking. The ranking is described in these terms for convenience purpose only. It would be readily apparent to one of ordinary skill in the relevant arts to use a comparable method of ranking.

After the ranking, the new data pattern 212 is compared to the organized nodes 204–210 according to rank using a second pattern matching technique. In the preferred embodiment, this comparison is made using fuzzy logic techniques, a different technique than was first used to rank the organized nodes 204–210. If the new data pattern 212 matches an organized node 204–210, the attribute coefficients corresponding to the matched organized node 204–210 are updated to reflect the new data pattern 212.

If a new data pattern 212 does not match an organized node 204–210 in the pattern map 202, a new organized node 216 representing the new data pattern 212 is added to the pattern map 202, resulting in an updated pattern map 302.

3. Control flow of processing a new data pattern using an AFFM.

Figure 4:
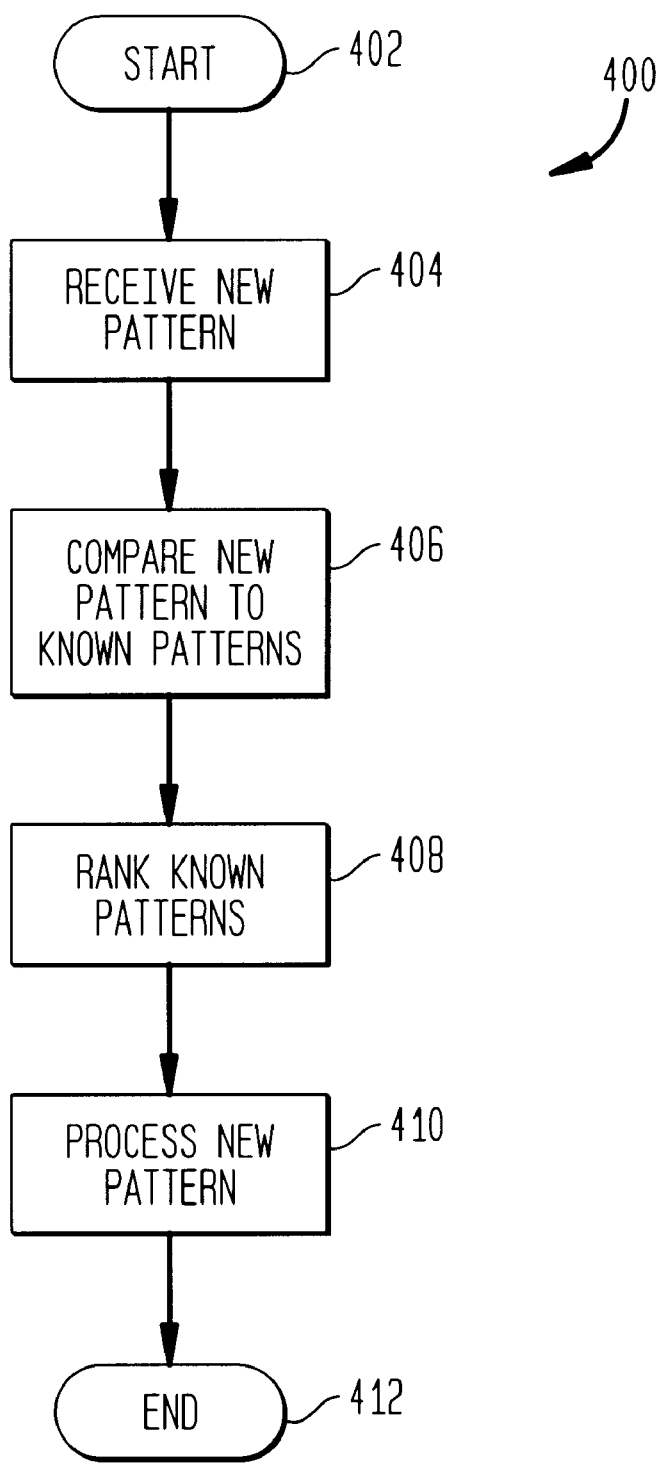
FIG. 4 is a control flow diagram showing the processing of a new data pattern using an AFFM.
Figure 5:
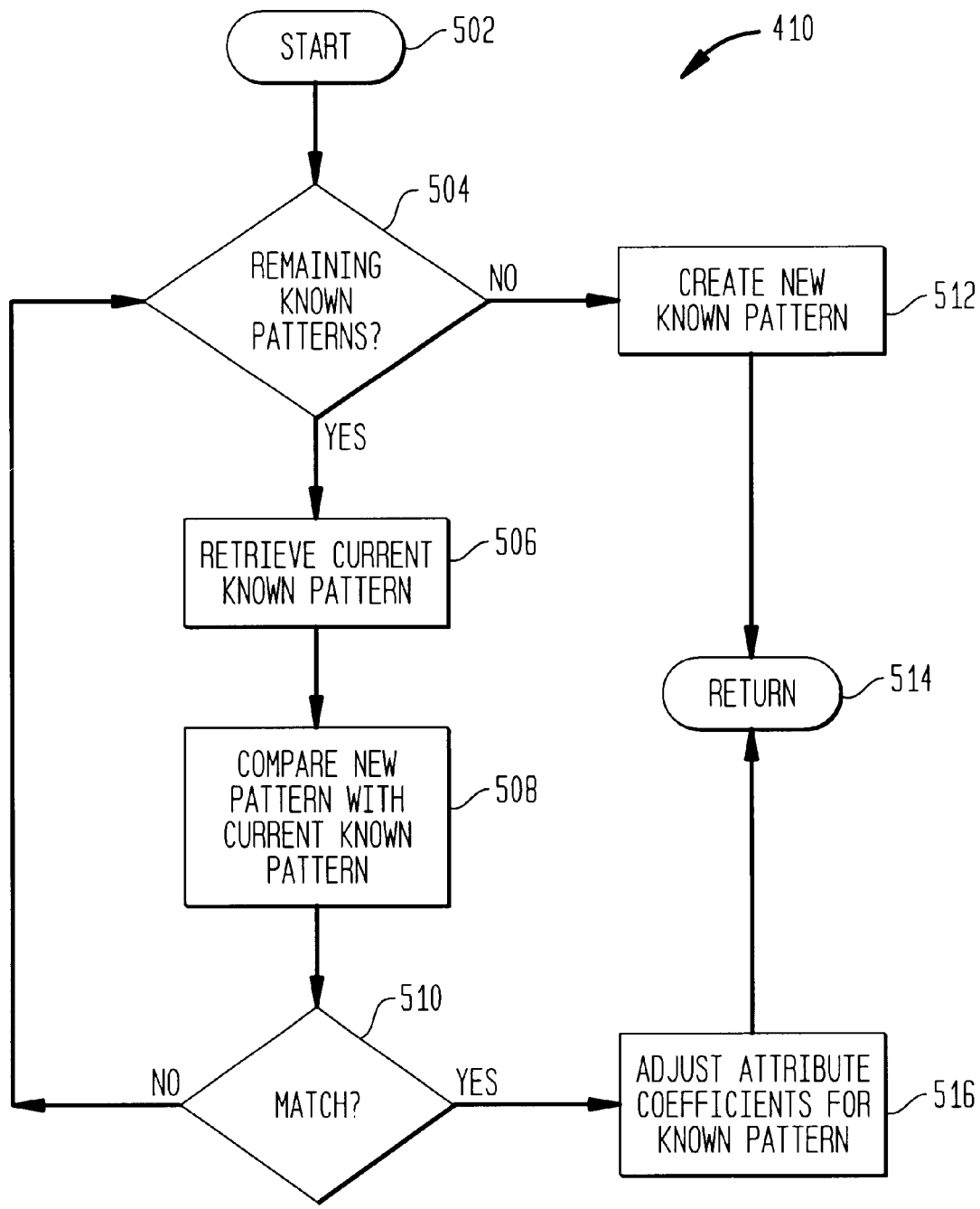
FIG. 5 is a control flow diagram showing the matching of a new data pattern using an AFFM.

FIGS. 4 and 5 are control flow diagrams showing the processing and matching of a new data pattern 212 using an AFFM system 200. In FIG. 4, processing begins at step 402 and immediately proceeds to step 404. In step 404, the AFFM system 200 receives a new data pattern 212 for identification and classification. Once the new data pattern 212 is received, the AFFM system 200 advances to step 406.

The AFFM system 200 of the present invention is directed to the identification and classification of a new data pattern 212. The means by which the new data pattern 212 enters the AFFM system 200 is well known in the relevant arts. It would be readily apparent to one of ordinary skill in the relevant arts to receive a data stream, identify a new data pattern 212 within that data stream, and input the new data pattern 212 into the AFFM system 200.

In step 406, the AFFM system 200 compares the new data pattern 212 to the known data patterns, or organized nodes 204–210, of a pattern map 202 using a first pattern matching technique. In the preferred embodiment, this comparison is made using distanced based pattern matching functions, and more specifically, the comparison is made using Feature Mapping techniques. Performing such comparison between two data patterns using Feature Mapping is well known in the relevant arts. The use of Feature Mapping is for convenience purposes only. It would be readily apparent for one of ordinary skill in the relevant arts to use any comparable distanced based pattern matching functions with the present invention.

Once calculated, the AFFM system 200 stores the distance measurement for each organized node 204–210 for future reference. Upon completing the comparison of the new data pattern 212 to each organized node 204–210, the AFFM system 200 proceeds to step 408.

In step 408, the AFFM system 200 ranks the organized nodes 204–210 of the pattern map 202 according to the distance measurement assigned to each organized node 204–210 as determined in step 406, thereby creating an ordered pattern map. The ranking is assigned such that the organized node 204–210 having the shortest distance measurement receives the highest ranking because that organized node 204–210 is the closest match to the new data pattern 212. Ranking continues in order according to each organized node's 204–210 respective distance measurement, with the organized node 204–210 having the longest distance measurement from the new data pattern 212 receiving the lowest ranking. When the ranking is complete, the AFFM system 200 proceeds to step 410. The ranking is described in these terms for convenience purpose only. It would be readily apparent to one of ordinary skill in the relevant arts to use a comparable method of ranking.

In step 410, the AFFM system 200 processes the new pattern 212 to find which organizational node 204–210 is the best match. The processing of step 410 is described in greater detail below. Once the new pattern 212 is processed, the AFFM system 200 proceeds to step 412 wherein the processing of the new data pattern 212 is complete.

The control flow of step 410 is shown in FIG. 5 in which the AFFM system 200 processes the new pattern 212 with the ranked organized nodes 204–210 of the pattern map 202. Processing of step 410 begins at step 502 and immediately proceeds to step 504. In step 504, the AFFM system 200 determines whether there are any remaining known patterns, or organized nodes 204–210, in the pattern map 202 that have not been processed against the new data pattern 212. If the AFFM system 200 determines that there are remaining organized nodes 204–210 to process, the AFFM system 200 proceeds to step 506.

In step 506, the AFFM system 200 retrieves the highest ranked organized node 204–210 in the pattern map 202 that has not been compared to the new data pattern 212. The retrieved organized node 204–210 is called the current known pattern. Upon selecting the current known pattern, processing proceeds to step 508.

In step 508, the AFFM system 200 compares the new data pattern 212 with the current known pattern, or organized node 204–210, retrieved in step 506 using a second pattern matching technique. In the preferred embodiment, this comparison is performed using fuzzy logic techniques wherein the new data pattern is compared to the current known pattern against an acceptable degree of fuzziness. The acceptable degree of fuzziness may be entered in to the AFFM system 200 by an operator, a fixed value, a calculated value, or by any other appropriate manner.

More specifically, in the preferred embodiment, the comparison is made using Fuzzy ART functions wherein an operator inputs an acceptable degree of fuzziness. Performing such comparison between two data patterns using Fuzzy ART is well known in the relevant art. The use of Fuzzy ART is for convenience purposes only. It would be readily apparent for one of ordinary skill in the relevant arts to use any comparable fuzzy logic techniques with the present invention and to input an acceptable degree of fuzziness by another means.

After the comparison is made, the AFFM system 200 proceeds to step 510. In step 510, the AFFM system 200 determines whether the new data pattern 212 matches the current know pattern according to the acceptable degree of fuzziness. The determination is based on whether the degree of closeness, or fuzziness, between these two data patterns satisfies a given threshold. If the matching threshold is satisfied, then there is a match and the AFFM system 200 proceeds to step 516.

In step 516, the AFFM system 200 found a match for the new data pattern 212. Therefore, the attribute coefficients of the current known pattern are adjusted to account for the attribute coefficients of the new data pattern 212. Once the new data pattern 212 has been incorporated into the current known pattern, processing continues to step 514 in which step 410 is complete and control is returned to FIG. 4.

Referring again to step 510, if the AFFM system 200 determines that the new data pattern 212 does not match the current known pattern, the AFFM system 200 returns to step 504. In step 504, the AFFM system 200 determines whether there are any remaining known patterns, or organized nodes 204–210, in the pattern map 202. If the AFFM system 200 determines that there are remaining organized nodes 204–210 to process, the AFFM system 200 returns to step 506, the processing of which is described in detail above.

Referring again to step 504, if the AFFM system 200 determines that there are no remaining known patterns, or organized nodes 204–210, the AFFM system 200 proceeds to step 512, In step 512, the AFFM system 200 knows that the new data pattern 212 did not match any of the organized nodes 204–210 in the pattern map 202 based on the fuzzy logic comparison. Therefore, the AFFM system 200 creates a new organized node 216 in the pattern map 202 that corresponds to the new data pattern 212. More specifically, the coefficients describing the new organized node 216 have values corresponding to the attributes of the new data pattern 212. Once the new organized node 216 is created, the AFFM system 200 proceeds to step 514 wherein the processing of step 410 is complete and control is returned to FIG. 4.

The AFFM system 200 uses two different pattern matching techniques when performing the two comparisons of a new data pattern 212 with the organized nodes 204–210 of a pattern map 202. A first pattern matching technique is used when ranking the organized nodes 204–210 into an ordered pattern map. A second pattern matching technique is used when comparing the new data pattern 212 against each organized node 204–210 individually to determine whether the new data pattern 212 matches any of the organized nodes 204–210.

In the preferred embodiment of the AFFM system 200, the first pattern matching technique comprises distance based pattern matching functions and the second pattern matching technique comprises fuzzy logic techniques. This description and use of distance based pattern matching functions and fuzzy logic techniques is for convenience purpose only. It would be readily apparent for one of ordinary skill in the relevant arts to reverse the use of these two types of pattern matching techniques or to use comparable pattern matching techniques with the AFFM system of the present invention.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for pattern matching a new data pattern using an adaptive fuzzy feature mapping having a pattern map storing one or more organized nodes, wherein each organized node represents a known data pattern defined by one or more attribute coefficients, comprising the steps of:

a. computing a distance measurement between the new data pattern and each organized node of the pattern map;

b. ranking each organized node of the pattern map according to said distance measurement computed in step (1) for said organized node, thereby creating an ordered pattern map;

c. traversing the organized nodes of said ordered pattern map according to said ranking of step (b) by selecting a current organized node; and d. determining whether the new data pattern matches said current organized node of said ordered pattern map by using fuzzy logic techniques and an acceptable degree of fuzziness.

2. The method for pattern matching according to claim 1, further comprising the step of:

e. adjusting the attribute coefficients of said current organized node if it is determined in step (d) that the new data pattern matches said current organized node.

3. The method for pattern matching according to claim 1, further comprising the step of:

e. creating a new organized node in the pattern map, wherein said new organized node represents the new data pattern, if it is determined in step (d) that the new data pattern does not match any organized node in the pattern map.

4. The method for pattern matching according to claim 1, wherein said step (b) ranks the organized nodes such that an organized node having a shortest distance to the new data pattern receives a highest rank, an organized node having a longest distance to the new data pattern receives a lowest rank, and the remaining organized nodes are ranked in between said highest rank and said lowest rank according to the respective said distance measurement of each organized node.

5. The method for pattern matching according to claim 4, wherein said step (c) traverses said ordered pattern map starting with said organized node having said highest rank and continues through said ordered pattern map according to said ranking and ending with said organized node having said lowest rank.

6. The method for pattern matching according to claim 1, wherein step (a) computes said distance measurement using Feature Mapping.

7. The method for pattern matching according to claim 1, wherein step (d) determines whether the new data pattern matches said current organized node using Fuzzy ART.

8. The method for pattern matching according to claim 1, further comprising the step of:

(e) inputting said acceptable degree of fussiness by an operator for determining whether the new data pattern matches said current organized node.

9. The method for pattern matching of claim 1, wherein said acceptable degree of fuzziness for determining whether the new data pattern matches said organized node using is a fixed set of one or more values.

10. The method for pattern matching according to claim 1, further comprising the step of:

e. inputting the new data pattern.

11. The method for pattern matching according to claim 1, further comprising the steps of:

e. receiving a data stream;

f. identifying a new data pattern in said data stream; and g. inputting the new data pattern.

12. A method for pattern matching a new data pattern using an adaptive fuzzy feature mapping having a pattern map storing one or more organized nodes, wherein each organized node represents a known data pattern defined by one or more attribute coefficients, comprising the steps of:

a. comparing the new data pattern with each organized node of the pattern map using a first pattern matching technique, generating a comparison result for each organized node;

b. ranking each organized node of the pattern map according to said comparison result computed in step (a) for said organized node, thereby creating an ordered pattern map;

c. traversing the organized nodes of said ordered pattern map according to said ranking of step (b) by selecting a current organized node; and d. determining whether the new data pattern matches said current organized node of said ordered pattern map by using a second pattern matching technique.

13. The method for pattern matching according to claim 12, wherein said first pattern matching technique comprises distance based functions and said second pattern matching technique is a fuzzy logic technique, or said first pattern matching technique is a fuzzy logic technique and said second pattern matching technique comprises distance based functions.

14. The method for pattern matching according to claim 13, wherein said distance based functions are Feature Mapping and said fuzzy logic technique if Fuzzy ART.

15. The method for pattern matching according to claim 12, further comprising the step of:

e. adjusting the attribute coefficients of said current organized node if it is determined in step (d) that the new data pattern matches said current organized node.

16. The method for pattern matching according to claim 12, further comprising the step of:

e. creating a new organized node in the pattern map, wherein said new organized node represents the new data pattern, if it is determined in step (d) that the new data pattern does not match any organized node in the pattern map.

17. A computer program product for use with a computer system, comprising:

a computer usable medium having computer readable program code means embodied in said medium for pattern matching a new data pattern using an adaptive fuzzy feature mapping having a pattern map storing one or more organized nodes, wherein each organized node represents a known data pattern defined by one or more attribute coefficients, said computer readable program code means comprising:

computing means for enabling a processor to compute a distance measurement between the new data pattern and each organized node of the pattern map;

ranking means for enabling a processor to rank each organized node of the pattern map according to said distance measurement computed by said computing means for said organized node, thereby creating an ordered pattern map;

traversing means for enabling a processor to traverse the organized nodes of said ordered pattern map according to said ranking by selecting a current organized node; and determining means for enabling a processor to determine whether the new data pattern matches said current organized node of said ordered pattern map by using fuzzy logic techniques and an acceptable degree of fuzziness.

18. The computer program product according to claim 17, said computer readable program code means further comprising:

adjusting means for adjusting the attribute coefficients of said current organized node if it is determined by said determining means that the new data pattern matches said current organized node.

19. The computer program product according to claim 17, said computer readable program code means further comprising:

creating means for creating a new organized node in the pattern map, wherein said new organized node represents the new data pattern, if it is determined by said determining means that the new data pattern does not match any organized node in the pattern map.

20. The computer program product according to claim 17, wherein said ranking means ranks the organized nodes such that an organized node having a shortest distance to the new data pattern receives a highest rank, an organized node having a longest distance to the new data pattern receives a lowest rank, and the remaining organized nodes are ranked in between said highest rank and said lowest rank according to the respective said distance measurement of each organized node.

21. The computer program product according to claim 20, wherein said traversing means traverses said ordered pattern map starting with said organized node having said highest rank and continues through said ordered pattern map according to said ranking and ending with said organized node having said lowest rank.

22. The computer program product according to claim 17, wherein said computing means computes said distance measurement using Feature Mapping.

23. The computer program product according to claim 17, wherein said determining means determines whether the new data pattern matches said current organized node using Fuzzy ART.

24. The computer program product according to claim 17, said computer readable program code means further comprising:

inputting means for inputting the new data pattern.

25. The computer program product according to claim 17, said computer readable program code means further comprising:

receiving means for receiving a data stream, identifying means for identifying a new data pattern in said data stream, and inputting means for inputting the new data pattern.

* * * * *